Jan. 17, 1956
C. D. BURNEY
2,730,829
TRAWLING GEAR
Filed Sept. 8, 1948
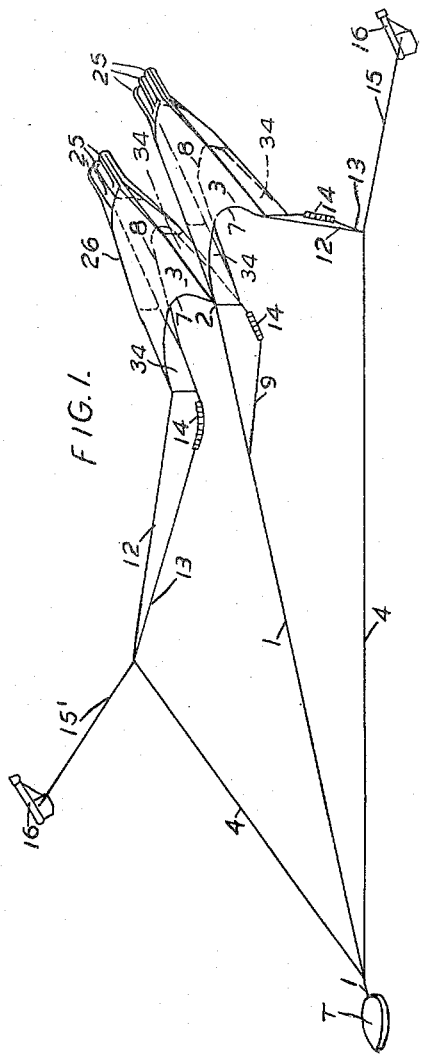
Inventor
Charles D. Burney
By
[signature]
Attorney

United States Patent Office 2,730,829
Patented Jan. 17, 1956

2,730,829
TRAWLING GEAR

Charles Dennistoun Burney, London, England, assignor to Fresh Frozen Foods Ltd., London, England Application September 8, 1948, Serial No. 48,251

Claims priority, application Great Britain September 18, 1947

10 Claims. (Cl. 43—8)

The present invention relates to trawling gear, which normally comprises a bag-like net or trawl which is towed along on the sea bottom by two cables connected to the trawling vessel and has the mouth spread open laterally by otter boards inclined to the direction of tow so as to produce an outward pull on the net during towing.

In addition to the otters spreading the net laterally, they have also been adapted in some cases to act as vertical spreaders for the mouth of the net. This arrangement however has had definite practical limitations in regard to the vertical spread obtainable.

The object of this invention is to provide a generally improved trawling gear, particularly in respect of the size of the mouth opening of the net.

The maximum size of the net mouth for a given net may be obtained; (a) by producing the maximum vertical spread of the mouth; and (b) by producing the maximum lateral spread.

By attaching the towing cable directly to the centre of the net mouth, generally to both the head rope and the foot rope, the important advantage is obtained of reducing the backward drag of the net on the otters, which therefore become more effective in spreading the net mouth laterally open to a greater extent, since the lateral pull of the otters only has to counter half of the total backward drag of the net between them, so that with a given size and design of otter a greater lateral spread of the net is obtainable.

According to the present invention the net system, comprising a set of side by side nets, is towed from the trawling vessel by a single cable which is attached to the centre of the head rope of the net, or of the set of nets, and has attached thereto, at a point between the net and the towing vessel, branch cables runnnig to the sides of the net and connected to the ends of the head ropes of the net, said branch cables having otters connected thereto in such manner as to pull them outwardly during towing, and thus spread the mouths of the net or nets open in the lateral direction.

In one arrangement according to the invention there are main branch cables connected to secondary branch cables running directly to the sides of the head rope and foot rope at the top and bottom of the net, or set of nets, whilst buoyant self directing otters tending when towed to run outwardly are connected by cables to said main branch cables, at or before their junction with the secondary branch cables in such manner as to pull them outwardly during towing, and thus spread the mouths of the net or nets open in the lateral direction at both top and bottom.

By attaching main and branch towing cables to the upper edge of the net mouth the tension of the cables, which extend at an incline from the trawler to the sea bottom, tends to pull the upper edge of the net mouth upwardly at both the sides and the centre. By attaching to the main and branch cables secondary cables which lead to the lower edge of the net mouth, the said lower edge may be prevented from dragging behind the upper edge, whilst if these secondary cables are weighted, the lower edge of the net mouth is held down, and thus the mouth can be opened vertically to the maximum extent, by the pull of the main and branch cables on the upper edge of the net at the sides. At the same time the outward pull of the otters is applied to the sides of the net at both its upper and lower edges, and their spreading action is utilized to the maximum extent.

Gussets 34 are preferably provided at the sides of the net, and the size of the forward end of the gussets governs the vertical spread of the net mouth, within the limits of the maximum opening permitted by the arrangement of towing cables previously described.

The buoyant self directing otters tending to travel outwardly during towing may be of the improved construction forming the subject matter of my concurrent United States application now Patent No. 2,661,562 granted December 8, 1953.

Other minor features of the invention will hereinafter appear from the following description with reference to the accompanying drawings, which illustrate the invention in such manner as to enable it to be more clearly understood, and also to show, by way of example only, how it may be carried into practice.

In the drawings:

The figure is a diagrammatic perspective view of trawling gear according to the invention.

In accordance with the invention trawling gear, such as is shown in the figure, is towed from the stern of a trawling vessel T by means of a single wire or cable 1, which is attached to the central point of the upper edge of a single trawl net if used, but is preferably, as shown, attached at 2 to the meeting edges of a pair of twin side-by-side trawl nets 3, 3.

At a suitable point in advance of the net system 3, 3 lateral branch towing cables 4, 4 are attached to the main towing cable 1, and are connected to the sides of the net or net system 3, 3. The branch cables 4 are actually connected by secondary upper branch cables 12 to the ends of the head ropes 7, 7 defining the upper edges of the net mouths, and by secondary lower branch cables 13 to the lateral ends of the foot ropes 8, 8.

Just before reaching the sides of the net or net system 3, 3 the secondary lower branch cables 13, 13 are weighted by weights 14 threaded thereon, and weights may be mounted on the central part of the catenary formed by the foot ropes 8, 8 in order to facilitate passage of the bottom of the net mouth over the sea bottom.

At a predetermined point in advance of the net system the main towing cable 1 has connected thereto a secondary lower cable 9, leading to the foot ropes 8, 8 at the junction of the two nets 3, 3.

In order to permit ample vertical spread of the mouth of the net without unduly deforming its shape, gussets 34 of suitable size are provided at the sides of the net, to confer a substantial rectangular shape on the net mouth and give the maximum vertical spread of the net mouth.

At the junctions of the secondary upper and lower branch cables 12, 12, 13, 13 with the branch towing cables 4, 4 are attached by single wires 15, buoyant self-directing otters 16, made in accordance with my aforesaid companion patent, which are so constructed that owing to their self directing action during towing, they tend to travel outwardly. These otters 16 are of streamline form, with stabilising surfaces at their rear ends, and a longitudinal vane surface inclined to the axis of their buoyant body portion. Preferably also these otters are so weighted that the vane surface is also inclined to the vertical so that a downward water thrust also arises which tends to drive the otter down towards the sea bottom, thus counteracting the rising effect as the towing speed increases.

By taking half the drag of the nets on the main towing table 1, and only one quarter of the drag on each of the lateral branch cables 4, 4, the resistance to the lateral pull of the otters 16 is correspondingly reduced and consequently a much greater spread of the net mouth is obtained using otters of normal size and power. In some cases adequate lateral spread of the net mouth may be obtainable by using smaller and less powerful otters, with a corresponding saving in the weight of the gear and greater ease of its manipulation.

The weights 14 threaded on the secondary lower cables 13, 9 are disposed at such a position along the cables, that, acting against the upward pull from the main cable 1 and lateral branches 4, 4, the secondary lower cables 13, 9, form a catenary, with the leading weights i. e. those remote from the net travelling above the level of the sea bottom, and the rear weights i. e. those nearest the net sliding freely along the bottom. This reduces the net drag due to the resistance offered by the unevenness of the sea bottom.

In order still further to reduce the net drag the net proper is preferably so designed that its cod end 25 streams off the sea bottom, i. e. it is made that it is of neutral buoyancy and tends to tow at a height above the sea bottom equal to half the height of the net mouth. The question of buoyancy of the net is determined partly by the nature of the material of which it is made, partly by the structure of the constituent cords or ropes, and partly by the duration of immersion in water. The fibres of which netting cord and ropes are made have various buoyancies and the fibrous material used in making cod end 25 should be of a buoyant nature in itself. Thus the upper and lower surfaces of the net are symmetrical in rear of the foot rope on opposite sides of the horizontal plane passing substantially through the centre of the mouth of the net when fully spread, so that the flow of the water causes the net to stream with the axis of its cod end at a level substantially equal to half the mean height of the net mouth in a vertical plane.

To reduce tthe liability of the foot rope 8 of the net to foul obstructions, wheels may be embodied in the foot ropes 8, 8 spanning the mouths of the net 3, 3 so that the foot ropes are raised above the sea bottom. It is quite normal to mount rotary members (spheres) on the foot ropes of trawl nets.

I claim:

1. Trawling gear comprising a pair of side by side trawl nets connected together at their adjacent leading edges, head ropes along the upper edges of the net mouths, a single towing main cable, attached to the ends of the head ropes at the connection between the two nets, a pair of main branch towing cables each having a connection at one end thereof to the outer end of its respective head rope and a point on the main towing cable between the nets and a trawler, weighted secondary branch cables connected between the main branch towing cables and the mouths of the nets, whereby the net mouths are spread vertically at both sides of each net, and forwardly divergently running otters connected by cables to said branch towing cables, whereby both of said net mouths are spread laterally.

2. Trawling gear as set forth in claim 1, including foot ropes along the lower edges of the net mouths, a weighted auxiliary main towing cable connecting a point on the main towing cable in advance of the net to the foot ropes.

3. Trawling gear as set forth in claim 1, including foot ropes along the lower edges of the net mouths, a weighted auxiliary main towing cable connecting a point on the main towing cable in advance of the nets to the foot ropes at the connection of the two nets.

4. Trawling gear, comprising a net system, having a head rope defining the upper margin of the mouth of the net system, a foot rope defining the lower margin of the mouth of the net system, side members connecting the ends of the foot rope and head rope together which define the side margins of the mouth of the net system, a single main towing cable attached to the head rope, branch towing cables connected to a point on the main towing cable between the net and the towing vessel when trawling, and divergently running buoyant otters connected by wires to points along said branch towing cables which points are also connected to the ends of the root rope by weighted auxiliary cables.

5. Trawling gear comprising a trawl net system, a head rope defining the upper margin of the mouth of the net system, a single main towing cable attached to the head rope, a pair of main branch towing cables connected between the ends of said head rope and a point on said towing cable between the net and a trawling vessel, a foot rope defining the lower margin of the mouth of the net system, weighted auxiliary branch cables connecting the ends of said foot rope to said main branch cables at points between the net and the trawling vessel, and divergently running otters connected to said points of said main branch cables, whereby the mouth of said net system is spread laterally.

6. Trawling gear comprising a pair of side by side trawl nets, head ropes along the upper edges of the net mouths, a single towing main cable, attached to the ends of the head ropes at the junction between the two nets, a pair of main branch towing cables each having a connection at one end thereof to the outer end of its respective head rope and a point on the main towing cable between the nets and a trawler, weighted secondary branch cables connected between the main branch towing cables and the mouths of the nets, and divergently running otters connected by wires to said branch towing cables, whereby both of said net mouths are spread laterally.

7. Trawling gear as set forth in claim 6, including foot ropes along the lower edges of the net mouths, a weighted auxiliary towing cable connecting a point on the main towing cable in advance of the net to the centre of the foot ropes.

8. Trawling gear as set forth in claim 6, including foot ropes along the lower edges of the net mouths, a weighted auxiliary towing cable connecting a point on the main towing cable in advance of the nets to the foot ropes at the junction of the two nets.

9. Trawling gear comprising a net system, a foot rope running along the lower margin of the mouth of the system, a head rope running along the upper margin of the mouth of the system, a single towing cable attached to the centre of the head rope so as during the towing to pull the head rope upwardly, main branch cables each having a connection at one end thereof to the outer end of its respective head rope and a point on the main towing cable between the net system and a trawler, secondary branch cables running from end points along the main branch cables to the ends of the foot rope, and buoyant self-directing otters tending to run divergently when towed connected to said main branch cables between a trawler and the points of attachment to the main towing cables of the main branch cables, so as to spread the mouth of the net system laterally open at both top and bottom.

10. Trawling gear according to claim 9, including weights on the secondary branch cables close to the net mouth to assist in holding the bottom of the net mouth down, while the top of the net mouth is pulled up by the main towing cable and the main branch cables.

References Cited in the file of this patent

UNITED STATES PATENTS

| | | |
|---|---|---|
| 1,548,412 | De Voogt et al. | Aug. 4, 1925 |
| 1,785,236 | Vigneron | Dec. 16, 1930 |
| 1,852,491 | Sykes | Apr. 5, 1932 |
| 1,869,018 | Malcolm | July 26, 1932 |

FOREIGN PATENTS

| | | |
|---|---|---|
| 11,643 | Great Britain | 1890 |
| 29,133 | Great Britain | 1904 |
| 259,913 | Great Britain | July 21, 1927 |
| 376,230 | Great Britain | Dec. 30, 1930 |
| 445,748 | Germany | Apr. 17, 1926 |
| 625,106 | France | Nov. 25, 1926 |
| 633,314 | France | Jan. 27, 1928 |